United States Patent [19]
Plumley

[11] Patent Number: 5,634,545
[45] Date of Patent: Jun. 3, 1997

[54] APPARATUS FOR CONTINUOUSLY CONVEYING COAL FROM A CONTINUOUS MINING MACHINE TO A REMOTE FLOOR CONVEYOR

[75] Inventor: Roger D. Plumley, Crab Orchard, W. Va.

[73] Assignee: Fairchild International Inc., Glen Lyn, Va.

[21] Appl. No.: 497,398

[22] Filed: Jun. 30, 1995

[51] Int. Cl.$^6$ ............................................. B65G 41/00
[52] U.S. Cl. ............................................................ 198/303
[58] Field of Search ................................ 198/300, 303, 198/318, 319, 587, 589; 299/43–45, 64–67

[56] References Cited

U.S. PATENT DOCUMENTS

| | | |
|---|---|---|
| 2,967,701 | 1/1961 | Wilcox. |
| 3,621,983 | 11/1971 | Arentzen et al. ................... 198/303 X |
| 4,031,997 | 6/1977 | Nelson ................................ 198/589 X |
| 4,256,213 | 3/1981 | Shaw et al. ............................. 198/303 |
| 4,341,424 | 7/1982 | Wilcox, Jr. et al. ...................... 299/57 |
| 4,646,906 | 3/1987 | Wilcox, Jr. et al. ..................... 198/303 |
| 4,776,445 | 10/1988 | Zitz et al. ................................. 198/303 |
| 5,301,787 | 4/1994 | Etherington et al. ................... 198/303 |

*Primary Examiner*—James R. Bidwell
*Attorney, Agent, or Firm*—Cushman Darby & Cushman IP Group of Pillsbury Madison & Sutro, L.L.P.

[57] ABSTRACT

An apparatus for use in a conveyor train for continuously conveying a supply of coal provided by a machine working at a mine face to a remote floor conveyor is provided. The apparatus includes at least one propelled conveyor assembly which may be pivotally connected to a combination of other like propelled conveyor assemblies and conventional bridge conveyor assemblies to form an articulated conveyor train ending from the machine to the remote floor conveyor. Each conveyor assembly has a conveying mechanism, with a receiving section and a discharge section that transports the supply of coal from the receiving section to the discharge section. The propelled conveyor assembly includes first and second crawler units disposed below and rotatably mounted to the propelled conveyor assembly. Each of the first and second crawler units includes a pair of longitudinally coextensive parallel endless track assemblies selectively independently drivable in either direction so as to permit the crawler unit to be pivoted horizontally. A leading frame assembly of the propelled conveyor assembly includes inboard and outboard sections constructed and arranged to pivot vertically about a inboard and outboard horizontal pivot axes, and a trailing frame assembly of the propelled conveyor assembly is constructed and arranged to pivot vertically about a trailing horizontal pivot axis.

25 Claims, 9 Drawing Sheets

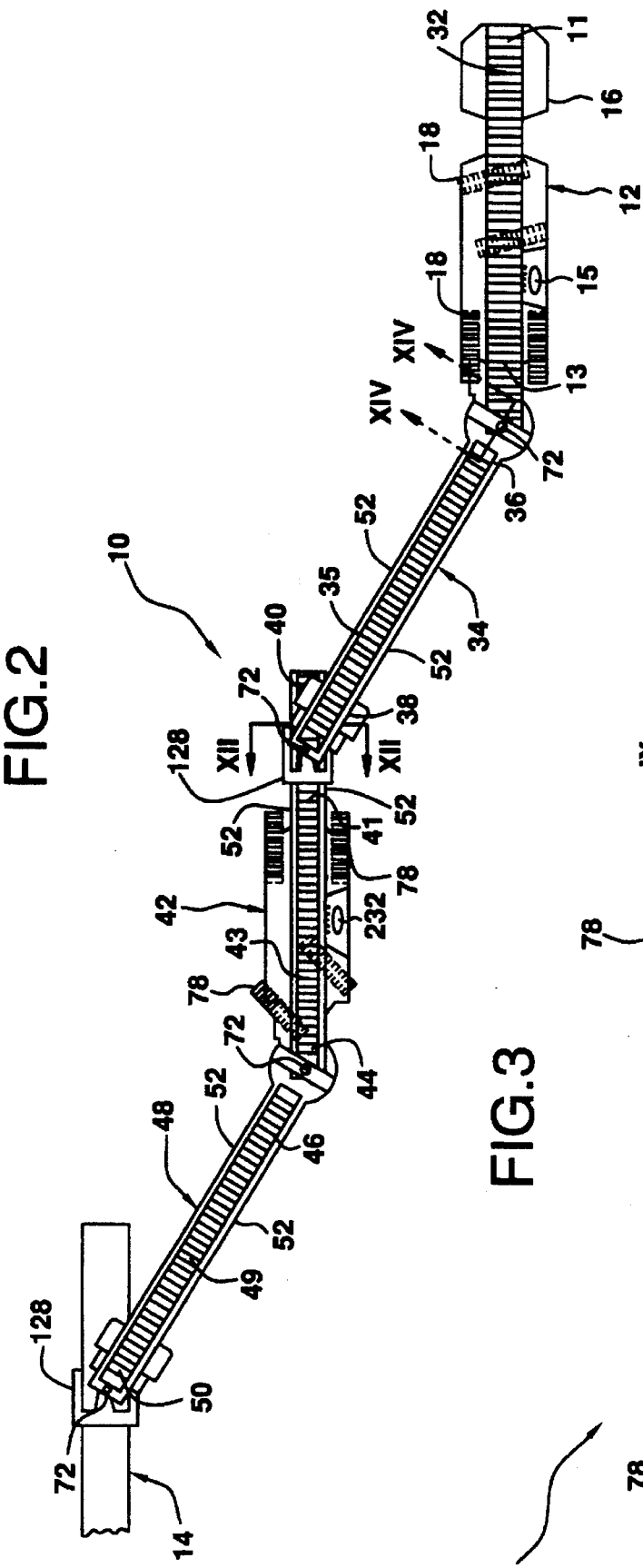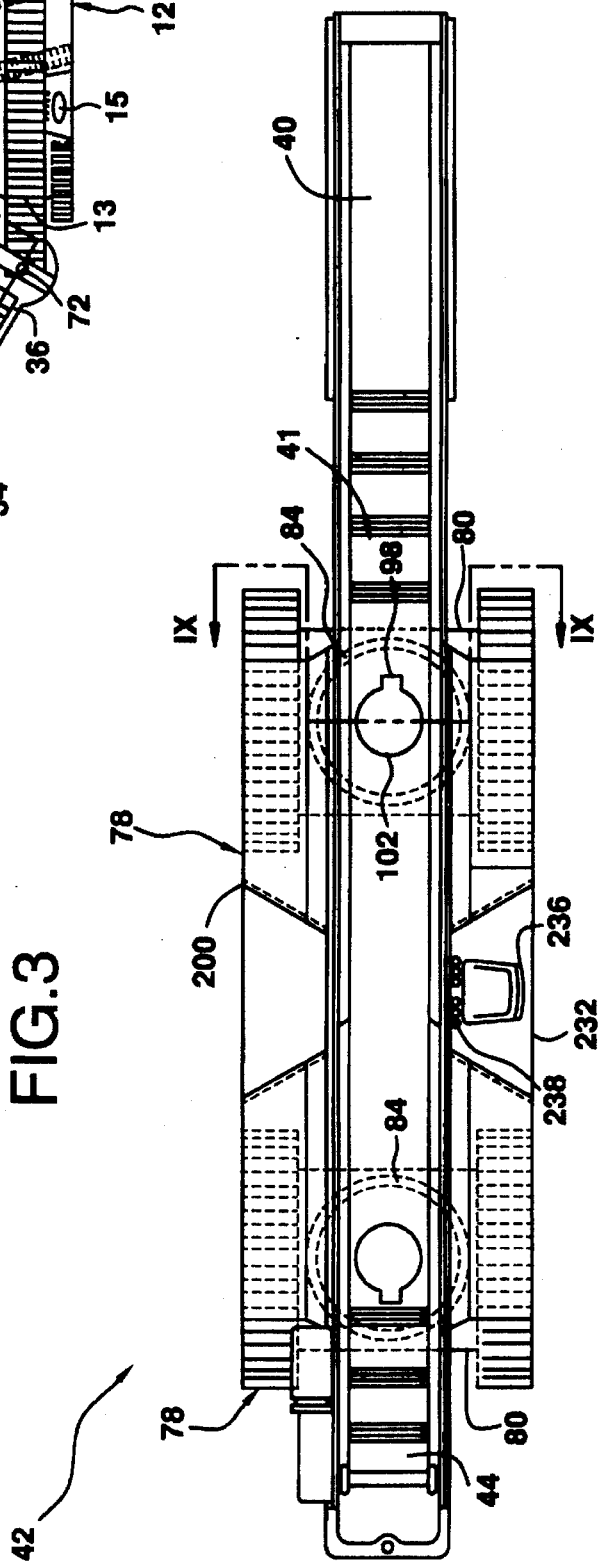

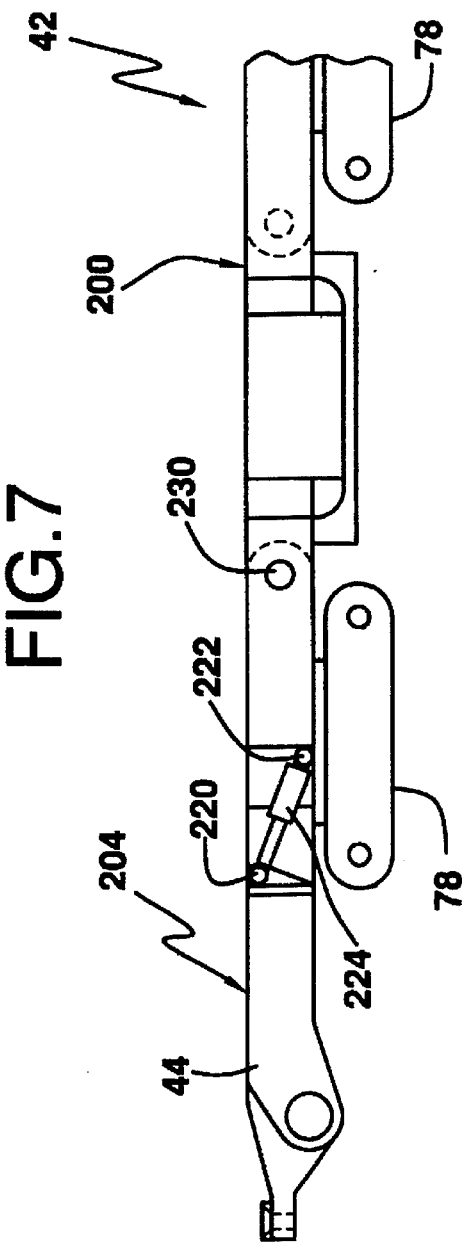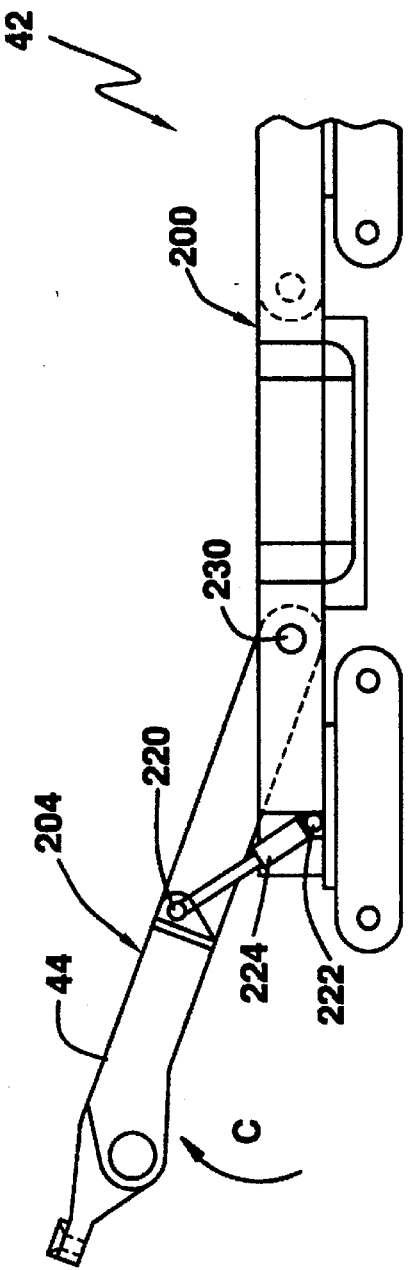

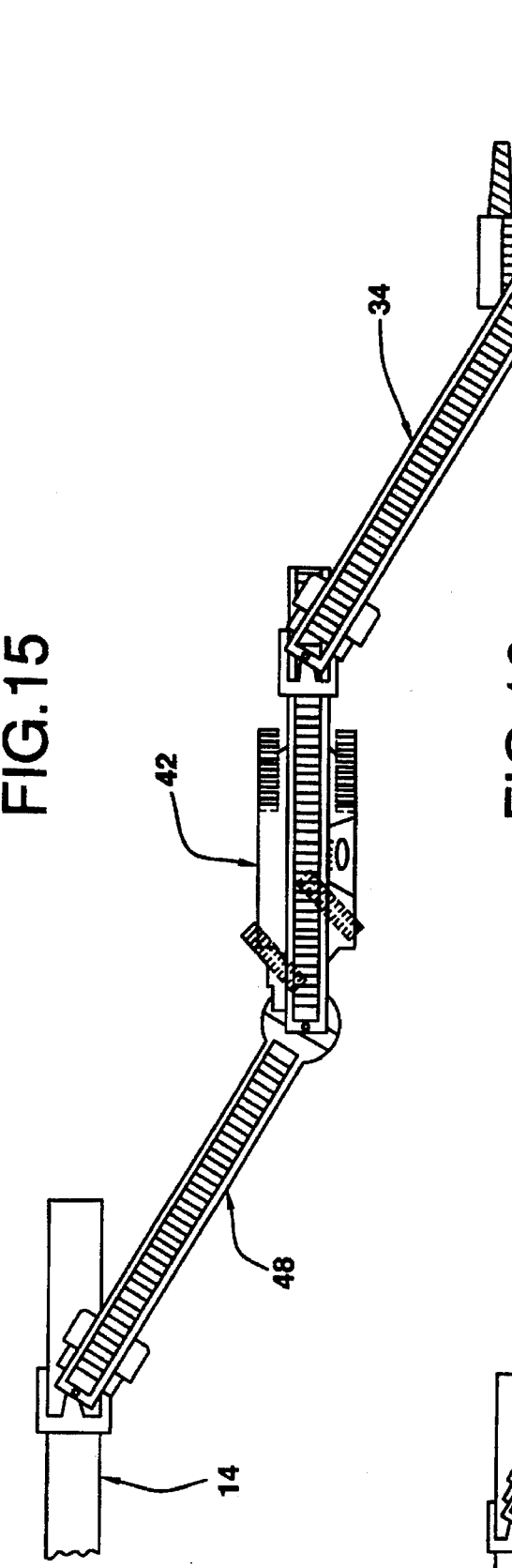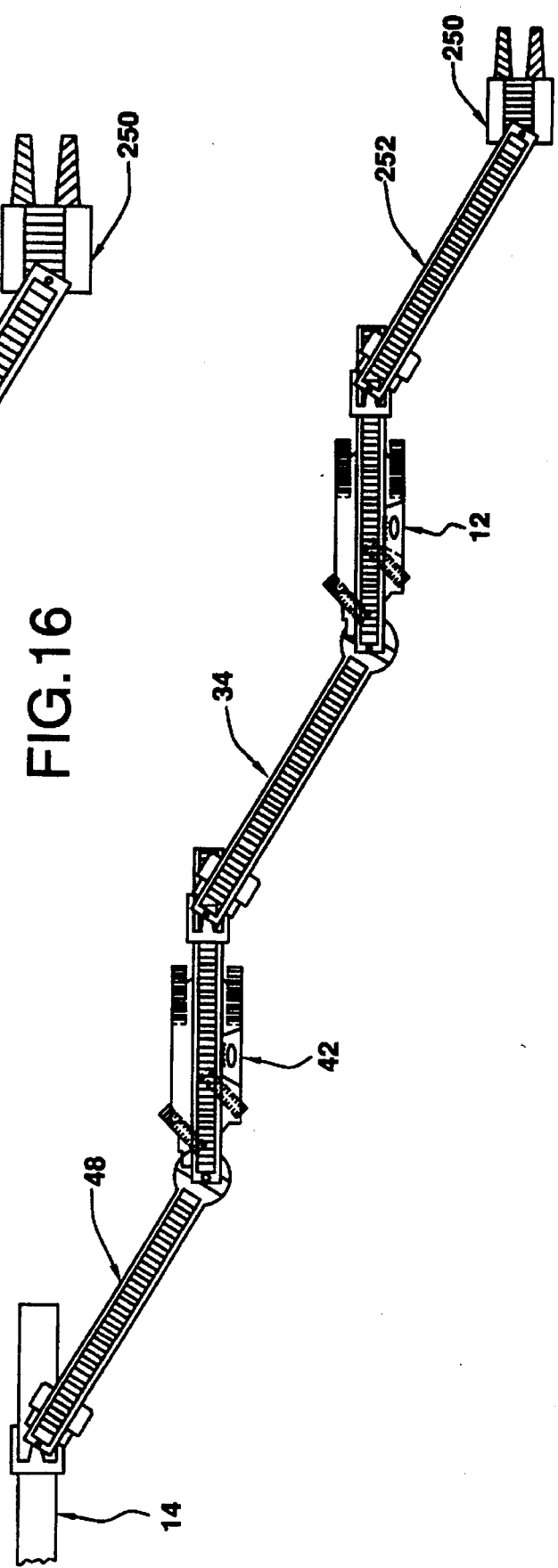

APPARATUS FOR CONTINUOUSLY CONVEYING COAL FROM A CONTINUOUS MINING MACHINE TO A REMOTE FLOOR CONVEYOR

BACKGROUND OF THE INVENTION

1. Field of the Invention

This invention relates to coal mining and more particularly to improved apparatus for continuously conveying coal produced by the operation of a continuous mining machine to a remote floor conveyor in the mine.

2. Description of the Related Art

A known apparatus of the type herein contemplated is disclosed in U.S. Pat. No. 4,646,906 dated Mar. 3, 1987. The apparatus disclosed in the patent includes three cooperating, elongated conveyor assemblies each having a coal receiving end and a discharge end. The first conveyor assembly is provided with a connection at its receiving end which serves to mount the same on the discharge end of the continuous mining machine, for limited tilting movement and for generally horizontal swinging movement with respect thereto, in a position to receive the coal discharging from the conveyor of the continuous mining machine. The receiving end of the second conveyor assembly is supported for longitudinal and transverse movement along the mine floor by a crawler unit which includes a crawler frame structure, which carries a pair of longitudinally, coextensive, parallel, power driven, endless track assemblies. The discharge end of the first conveyor assembly is mounted on the receiving end of the second conveyor assembly for longitudinal movement thereabove, for limited tilting movement with respect thereto, and for generally horizontal swinging movement with respect thereto, as by a rolling carriage or dolly, so as to discharge the coal from the discharge end of the first conveyor assembly onto the receiving end of the second conveyor assembly in any position of movement with respect thereto. The discharge end of the second conveyor assembly is mounted on the receiving end of the third conveyor assembly for longitudinal movement thereabove, for limited tilting movement with respect thereto, and for generally horizontal swinging movement with respect thereto, as by a carriage so as to discharge the coal from the discharge end of the second conveyor assembly onto the receiving end of the third conveyor assembly in any position of movement with respect thereto. The receiving end of the third conveyor assembly is supported for longitudinal and transverse movement along the mine floor by a crawler unit identical to the aforesaid crawler unit. Finally, the discharge end of the third conveyor assembly is mounted on the floor conveyor for longitudinal movement thereabove, for limited tilting movement with respect thereto, and for generally horizontal swinging movement with respect thereto, as by a rolling carriage or dolly, so as to discharge the coal from the discharge end of the third conveyor assembly onto the floor conveyor in any position of movement with respect thereto.

By virtue of the articulated nature of the connections of the three conveyor assemblies between the continuous mining machine and the floor conveyor, substantial movements of the continuous mining machine with respect to the stationary floor conveyor are accommodated while maintaining a continuous capability of conveying the coal from the continuous mining machine to the floor conveyor.

The arrangement disclosed in the aforesaid patent has been produced commercially and has proven successful in operation. However, with each crawler unit being coupled with a separate conveyor assembly, the arrangement requires an operator for each separate crawler unit, plus an operator for the continuous mining machine. Furthermore, having separated crawler units causes additional complexity and requires additional components because each crawler unit is substantially remote from the next crawler unit.

SUMMARY OF THE INVENTION

It is an object of the present invention to provide an apparatus of the type described which overcomes the above-mentioned disadvantages. In accordance with the principles of the present invention, this objective is obtained by providing an apparatus for use in a conveyor train for conveying a supply of coal supplied by a machine working at a mine face to a spaced floor conveyor arranged to convey the coal away from the conveyor train. The apparatus comprising: a propelled conveyor assembly having a conveying mechanism providing a receiving section and a discharge section, the conveying mechanism being constructed and arranged to convey a supply of coal from the receiving section thereof to the discharge section thereof. The propelled conveyor assembly is adapted to receive, at the receiving section of the conveying mechanism thereof, a supply of coal which has been supplied by the machine working at the mine face. The propelled conveyor assembly includes a frame assembly and first and second crawler units disposed below and in supporting relation to the frame assembly, the first and second crawler units being disposed in longitudinally spaced relationship with respect to each other and between the receiving section of the conveying mechanism of the propelled conveyor assembly and the discharge section of the conveying mechanism of the propelled conveyor assembly. Each of the first and second crawler units includes a crawler frame structure, a pair of longitudinally coextensive parallel endless track assemblies connected with the crawler frame structure, a crawler mounting assembly constructed and arranged to support an associated end of the frame assembly for horizontal rotating movement of each crawler unit about a vertical axis disposed between the pair of endless track assemblies and intermediate the longitudinal extent thereof, and a power operated drive unit constructed and arranged to selectively independently drive each endless track assembly of the pair of endless track assemblies of each crawler unit in either direction so as to permit each crawler unit to be pivoted horizontally about the vertical axis with respect to the frame assembly in response to each endless track assembly being driven at equal speeds in opposite directions to thereby enable the crawler frame structure to be translated from any pivotal position, into which each crawler unit has been pivoted, rectilinearly in either direction in response to each endless track assembly being driven at equal speeds in that direction.

The conveying mechanism of the propelled conveyor assembly preferably further includes an intermediate section continuous with and disposed rearwardly from the receiving section that is constructed and arranged to pivot vertically about an intermediate horizontal pivot axis with respect to the frame assembly. The receiving section of the propelled conveyor assembly is constructed and arranged to pivot vertically about a receiving section horizontal pivot axis with respect to the intermediate section, and the discharge section of the propelled conveyor assembly is constructed and arranged to pivot vertically about a discharge section horizontal pivot axis with respect to the frame assembly.

By arranging the crawler units on a single conveyor assembly, both crawler units may be operated by a single operator, thus reducing the total number of operators required for the mining operation. In addition, with both crawler units installed on the central frame structure of a single propelled conveyor assembly, the overall crawler system is simplified.

Tiltable receiving, intermediate, and discharge sections of the propelled conveyor assembly provide a number of advantages. This arrangement provides the apparatus with a means for extricating the apparatus from a stalled condition caused by an upwardly bulging mine floor which has the effect of removing the weight load from the endless track assemblies of the propelled conveyor assembly so that there is insufficient weight load thereon to effect tractive movement. By effecting pivoting movement of the discharge section and/or the intermediate section into its/their raised position(s), a relative lowering of the endless track assemblies with respect to the floor, into traction engagement with the floor, is effected. Also, the ability to pivot the receiving section of the leading frame assembly of the propelled conveyor assembly makes it possible to traverse a hump encountered in a roll condition in a coal vein without the forwardmost end of the propelled conveyor assembly contacting the ceiling of the shaft.

Preferably, each crawler unit is provided with a disc brake for selectively locking out the crawler unit with respect to the frame assembly of the propelled conveyor assembly to prevent horizontal rotation of the crawler unit with respect to the frame assembly. Also, a conveyor operator's station is preferably provided on the frame assembly of the propelled conveyor assembly between the first and second crawler units.

The apparatus may also include conventional bridge conveyor assemblies extending between the propelled conveyor assembly and the floor conveyor and between the propelled conveyor assembly and the machine working at the mine face. In addition, multiple propelled conveyor assemblies and bridge conveyor assemblies may be combined to extend the length of the conveyor train extending between the floor conveyor and the machine working at the mine face.

These and other objects of the present invention will become more apparent during the course of the following detailed description and appended claims. The invention may best be understood with reference to the accompanying drawings wherein an illustrative embodiment is shown.

BRIEF DESCRIPTION OF THE DRAWINGS

FIG. 2 is a top plan view illustrating an operative position of the apparatus embodying the principles of the present invention in a detached system comprising two bridge conveyors and two mobile bridge carriers operatively extending from a remote floor conveyor;

FIG. 3 is a top plan view of the propelled conveyor assembly of the present invention;

FIG. 7 is a fragmentary side elevational view of the propelled conveyor assembly of the present invention illustrating the discharge section thereof in a level position;

FIG. 8 is a fragmentary side elevational view of the propelled conveyor assembly of the present invention illustrating the discharge section thereof in a vertically pivoted position;

FIG. 15 is a top plan view illustrating an operative position of the apparatus embodying the principles of the present invention in an attached system comprising two bridge conveyors and a single mobile bridge carrier operatively extending from a remote floor conveyor to a continuous mining machine;

FIG. 16 is a top plan view illustrating an operative position of the apparatus embodying the principles of the present invention in an attached system comprising three bridge conveyors and two mobile bridge carriers operatively extending from a remote floor conveyor to a continuous mining machine.

DETAILED DESCRIPTION OF THE PRESENTLY PREFERRED EXEMPLARY EMBODIMENT

Figure 1:
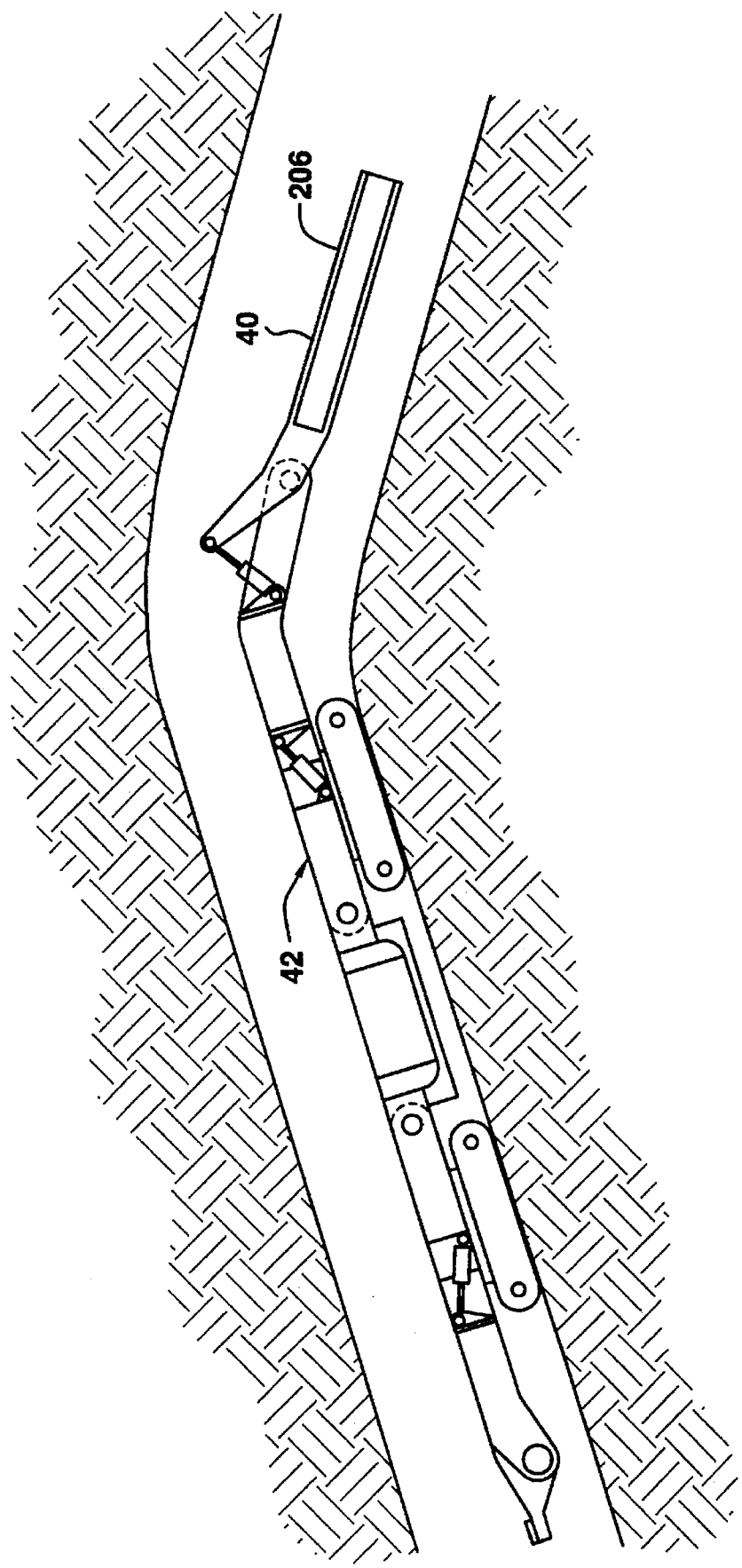
FIG. 1 is a side elevational view of a propelled conveyer assembly, according to the principles of the present invention, within a mine shaft.

Referring now more particularly to the drawings, there is shown in FIG. 2 an apparatus, generally indicated at 10, for use in a conveyor train extending between a machine working at a mine face and a remote floor conveyor embodying the principles of the present invention.

As an illustration of the present invention, the apparatus 10 shown in FIG. 2 consists essentially of four main components, each of which is in the form of an elongated conveyor section or assembly. A first conveyor assembly, designated generally by reference number 12, is a propelled conveyor assembly or mobile bridge carrier. The propelled conveyor assembly 12 is a self-propelled unit having a conveyor mechanism 32 providing a coal receiving section 11 and a coal discharge section 13. The conveyor mechanism 32 conveys coal supplied by a machine working at the mine face (not shown) from the receiving section 11 of the conveyor mechanism 32 to the discharge section 13. The propelled conveyor assembly 12 is transportable on two crawler units 18 as will be described in more detail below. The apparatus 10 shown in FIG. 2 is a detached system; the propelled conveyor assembly 12 (the lead conveyor assembly) is not attached to a machine working at the mine face at the receiving section 11 of the conveyor mechanism 32 thereof. The system show in FIG. 2 is commonly known as a "2+2" system. The propelled conveyor 12, being the lead conveyor in the detached system illustrated in FIG. 2, preferably includes a hopper assembly 16 for catching coal supplied by the machine at the mine face and directing the coal to the receiving section 11 of the conveyor mechanism 32.

The second conveyor assembly, designated generally by 34, is a bridge conveyor assembly and has a conveying mechanism 35 extending along the length thereof providing a receiving section 36 suitably connected to receive coal discharged from the discharge section 13 of the propelled conveyor assembly 12. A third conveyor assembly 42 has a coal conveying mechanism 43 providing a receiving section 40 and a discharge section 44. Bridge conveyor assembly 34 includes a discharge section 38 which is connected to deposit coal conveyed thereby onto the receiving section 40 of the third conveyor assembly 42. The third conveyor assembly 42 is also a propelled conveyor assembly. The fourth conveyor assembly 48 is second bridge conveyor and has a conveying mechanism 49 providing a receiving section 46 and a discharge section 50. The discharge section 44 of the propelled conveyor assembly 42 is disposed to transfer coal conveyed thereby onto the receiving section 46 of the second bridge conveyor assembly 48. The discharge section 50 of the second bridge conveyor assembly 48 is mounted to discharge coal conveyed by the second bridge conveyor assembly 48 onto the floor conveyor 14.

Figure 12:
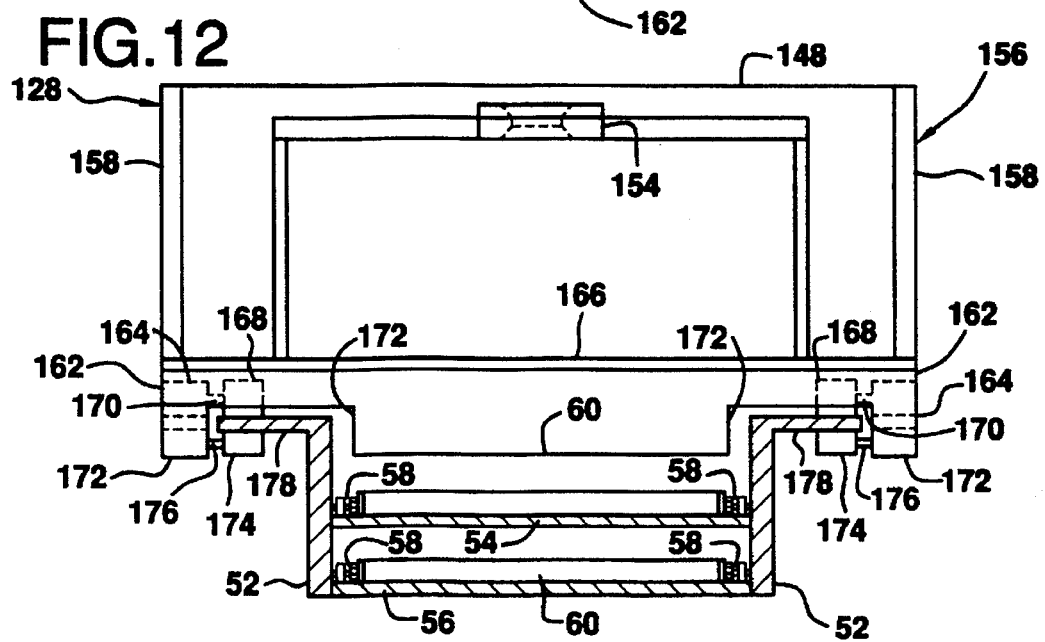
FIG. 12 is a front view, partly in section, of the dolly assembly of the preferred embodiment of the present invention taken along the line XII—XII in FIG. 2.

The bridge conveyor assemblies 34 and 48 are conventional bridge units and include conveying mechanisms 35, 49, respectively, that are formed of conventional conveyor structure, either of the scraper type as shown, or of the belt type. As shown in FIGS. 2 and 12, the conveyor mechanisms 32, 35, 43, and 49 preferably include a frame formed essentially of a pair of longitudinally extending side rails 52 rigidly interconnected in transversely spaced relation by upper and lower central plates 54 and 56 extending therebetween, see, for example, FIG. 12. The scraper portion of conveyor assemblies 34, 42, and 48 is of the dual chain type formed essentially of a pair of endless chains 58 having a series of longitudinally spaced flights 60 extending laterally or transversely therebetween.

It will be understood that, in accordance with standard practice, the chains are trained about sprocket wheels (not shown) fixed to shafts journaled on the receiving and discharging ends of the frame structures supporting the conveyor mechanisms of the associated conveyor assemblies. It will also be understood that each conveyor mechanism of each conveyor assembly also includes an appropriate electric motor or the like (not shown) for driving one of the shafts and hence moving the associated endless chain 58 in a direction such that an operative upper run of flights 60 move over the associated upper plate 54 in a direction from the receiving end to the discharge end thereof.

As is illustrated in FIGS. 3–8, the propelled conveyor assembly 42 (which is identical to propelled conveyor assembly 12 except for the provision of hopper assembly 16 on propelled conveyor assembly 12) includes a frame assembly which provides a central frame structure 200 disposed between a leading frame assembly 202 and a trailing frame assembly 204. Crawler units 78 are mounted below the central frame structure 200 at generally opposite ends thereof. As can be seen in FIGS. 7 and 8, the trailing frame assembly 204 of the propelled conveyor assembly 42 supports the discharge section 44 thereof and is designed to pivot vertically with respect to the central frame structure 200. More particularly, the central frame structure 200 includes a pivot anchor point 230 at which the trailing frame assembly 204 is pivotally mounted. Also included on the central frame structure 200 is an anchor point 222 which corresponds to an anchor point 220 on the trailing frame assembly 204 for supporting an actuator 224 therebetween. The actuator 224 can be of the conventional hydraulic piston/cylinder type. As shown in FIG. 8, actuation of the actuator 224 causes the trailing frame assembly 204 to pivot with respect to the central frame structure 200 about the pivot anchor point 230 in the direction indicated by arrow C. It will be understood that a corresponding actuator and associated anchor points are provided on the opposite side of the central frame structure 200 and the trailing frame assembly 204.

The trailing frame assembly 204 supporting the discharge section 44 can travel from a level position as shown in FIG. 7 to a raised position as shown in FIG. 8. It is preferable that the trailing frame assembly 204 not travel below the level position. It is presently contemplated, for the preferred embodiment, that the range of travel of the trailing frame assembly 204 be limited to 15° above level position to avoid undue complexities in the travel and orientation of the conveyor belt or chain.

Figure 5:
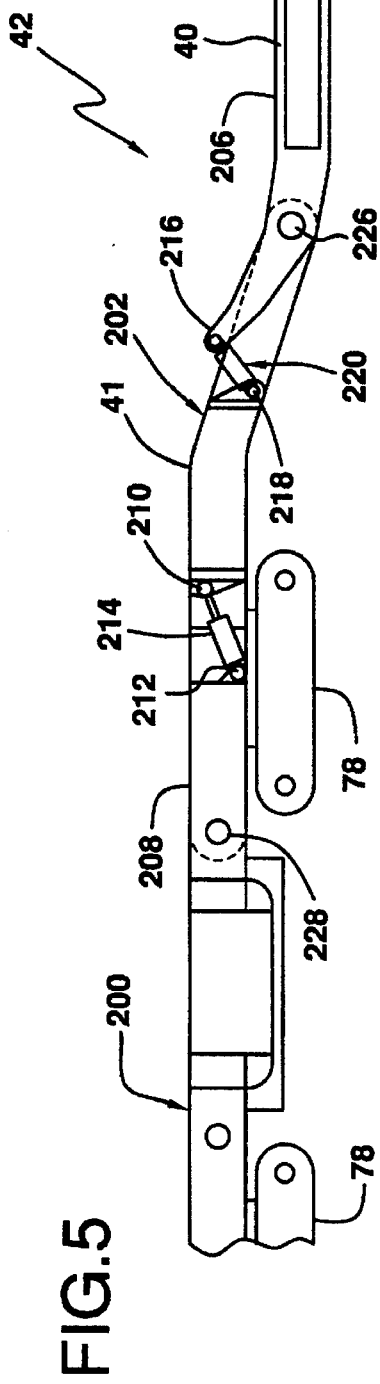
FIG. 5 is a fragmentary side elevational view of the propelled conveyor assembly of the present invention illustrating the receiving and intermediate sections thereof in a level position.
Figure 6:
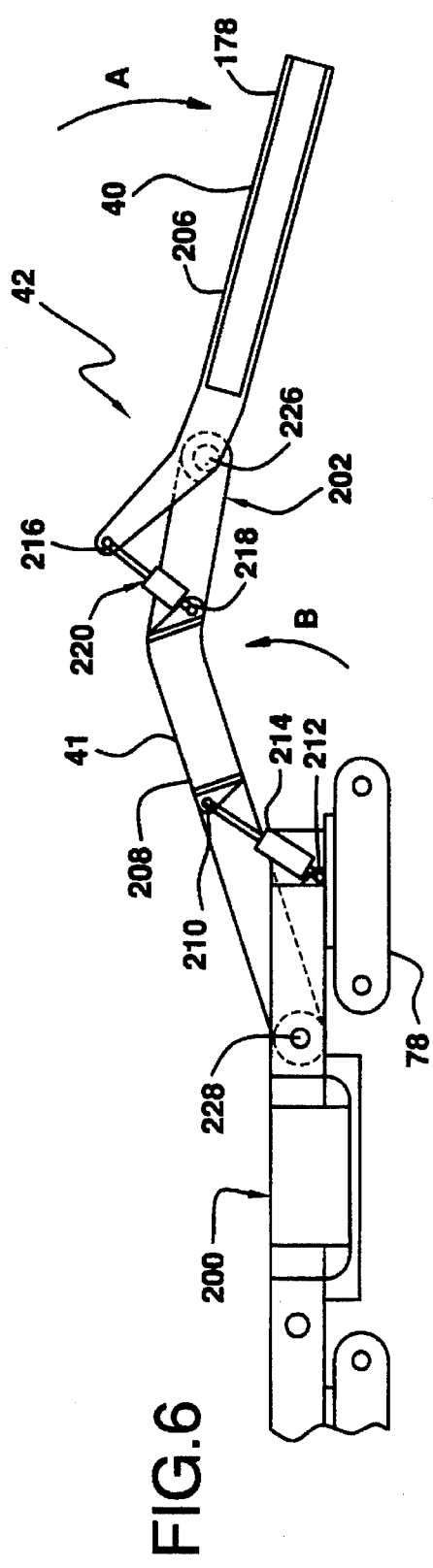
FIG. 6 is a fragmentary side elevational view of the propelled conveyor assembly of the present invention illustrating the receiving and intermediate sections thereof in a vertically pivoted position.

As can be seen in FIGS. 5 and 6, the leading frame assembly 202 of the propelled conveyor assembly 42 includes an inboard section 208 that supports an intermediate section 41 of the conveying mechanism 43 and an outboard section 206 that supports the receiving section 40 thereof. The inboard section 208 and the outboard section 206 are designed to pivot vertically with respect to each other and with respect to the central frame structure 200. A pivot anchor point 228 is provided on the central frame structure 200 at which the inboard section 208 is pivotally mounted. An anchor point 212 is provided on the central frame structure 200 and a corresponding anchor point 210 is provided on the inboard section 208. An actuator 214 is mounted between the anchor points 212 and 210. The actuator 214 may be of a conventional hydraulic piston/cylinder type. A pivot anchor point 226 is provided on the inboard section 208 at which the outboard section 206 is pivotally mounted. An anchor point 218 is provided on the inboard section 208 and a corresponding anchor point 216 is provided on the outboard section 206. An actuator 220 is mounted between the anchor points 218 and 216. The actuator 220 may be of a conventional hydraulic piston/cylinder type.

As can be seen in FIG. 6, actuation of the actuator 214 causes the inboard section 208 to pivot vertically about the pivot anchor point 228 in the direction indicated by arrow B. Similarly, actuation of the actuator 220 causes the outboard section 206 to pivot vertically, about the pivot anchor point 226, with respect to the inboard section 208 in the direction indicated by arrow A. It will be understood that an actuator corresponding to actuator 214 mounted between anchor points corresponding to anchor points 212 and 210 may be provided on the opposite side of the central frame structure 200 and the inboard section 208. Likewise, an actuator corresponding to actuator 220 mounted between anchor points corresponding to anchor points 218 and 216 may also be provided on the opposite side of the inboard section 208 and the outboard section 206.

The inboard section 208 preferably can travel from a level position, as shown in FIG. 5, to a raised position as shown in FIG. 6. Preferably, the inboard section 208 cannot travel below the level position. The outboard section 206 preferably can travel from the level position shown in FIG. 5 to a lowered position shown in FIG. 6. It is presently contemplated, for the preferred embodiment, that the ranges of travel of the inboard and outboard sections be limited to 15° above and 10° below level position, respectively, to avoid undue complexities in the travel and orientation of the conveyor belt or chain.

As shown in FIG. 1, the ability to dip the outboard section 206 of the leading frame assembly 202 downward allows the propelled conveyor assembly 42 and the attached bridge conveyor assembly (not shown) to travel through a roll condition in a vein without scraping the ceiling of the mine shaft.

Preferably, a conveyor operator's station is provided at 232 of the central frame structure 200. The conveyor operator's station 232 would preferably include a seat 236 and various controls 238.

All of the conveyor assemblies are mounted at their respective receiving sections so that the associated conveyor assembly can have a pivoting movement in a horizontal plane about a vertical axis and a limited tilting movement in a vertical plane about a horizontal axis. Preferably, the connections also provide for a limited amount of vertical movement.

Preferably, the connections at the discharge sections 38, 50 of the first and second bridge conveyor assemblies 34, 48, respectively, also allow longitudinal motion of one conveyor assembly with respect to the conveyor assembly to which it is connected.

Figure 11:
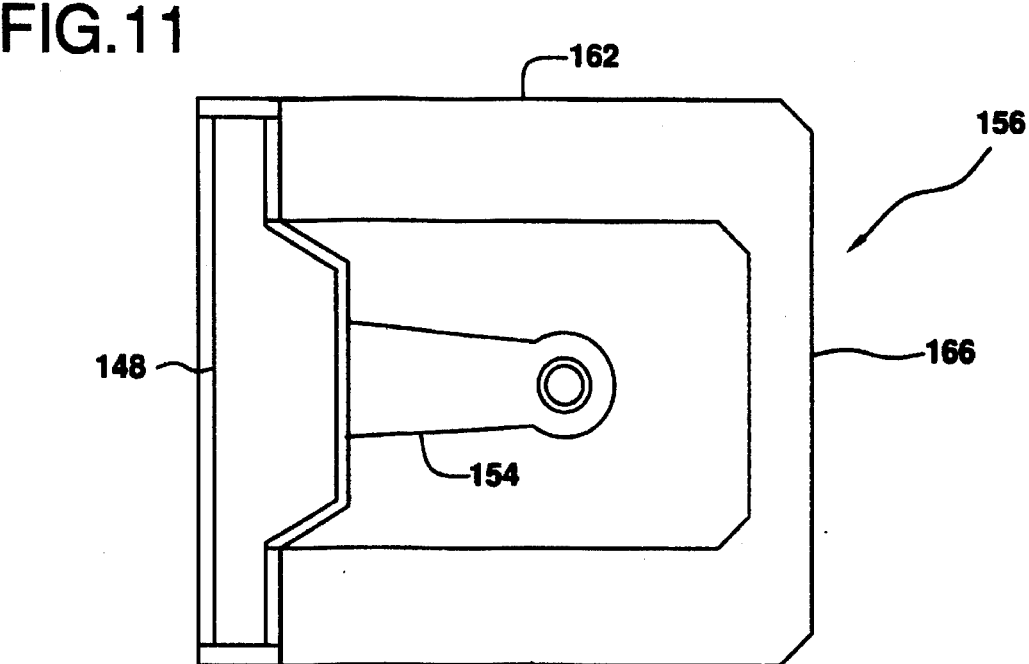
FIG. 11 is a top plan view of a dolly frame member of a dolly assembly of the preferred embodiment of the present invention.
Figure 13:
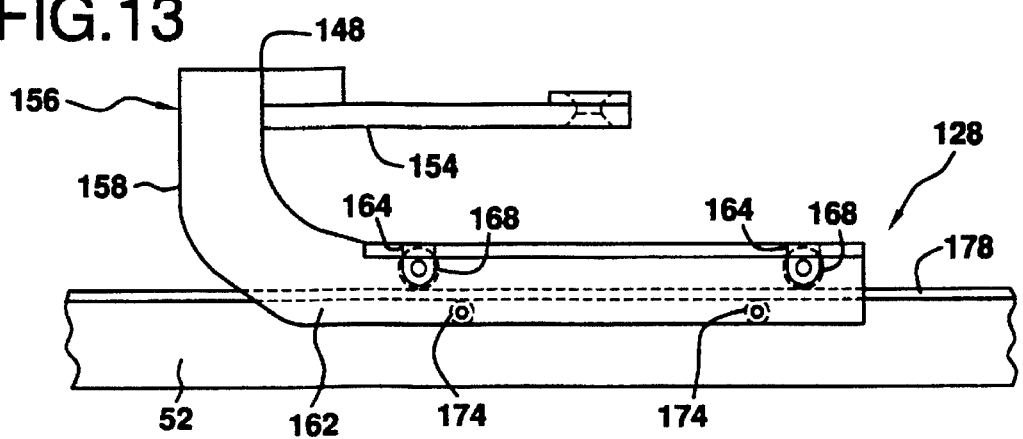
FIG. 13 is a fragmentary side elevational view of the dolly assembly of FIG. 12.

This longitudinal motion is provided by means of a dolly assembly 128 that is connected to and is able to translate along an extent of the receiving section 40 of the propelled conveyor assembly 42 and the receiving section of floor conveyor 14. As shown in FIGS. 11–13, dolly assembly 128 includes a dolly frame 156 that rides on tracks defined by horizontal flanges 178 extending laterally from side rails 52. The dolly frame 156 comprises vertical side supports 158, longitudinal members 162 extending along opposing sides of the dolly 156 parallel to side rails 52 and from which the vertical side supports 158 extend upwardly, a lower cross member 166 extending across the ends of the longitudinal members 162, an upper cross member 148 extending across the ends of the vertical side supports 158, and a tongue 154 extending horizontally in a cantilevered manner from the middle of the upper cross member 148. All connected portions of the dolly frame 156 are fixed to one another in a suitable manner as by welding or the like.

The longitudinal members 162 include portions extending along the outside of flanges 178. Each longitudinal member 162 forms a rigid part of a roller carrying subassembly which also includes roller mounting lugs 172 and 164 extending laterally from an inside surface of the portion of the longitudinal members 162 extending along the outside of flanges 178. The roller mounting lugs 164 serve to rotatably mount a pair of longitudinally spaced rollers 168, rotatable about transversely extending horizontal axes, as by stub shaft assemblies 170, fixed to the ends of the associated roller mounting lug 164. The pairs of rollers 168 serve to support the dolly assembly 128 for rolling movement longitudinally along the associated conveyor assembly, as by the horizontal flanges 178.

In order to retain the rollers 168 of each carriage assembly 128 in rolling contact with the associated flanges 178, a pair of longitudinally spaced guide rollers 174 are rotatably mounted below the associated flanges 178 to the roller mounting lugs 172 so as to be rotatable about transversely extending horizontal axes, as by stub shaft assemblies 176, fixed to the ends of the associated roller mounting lug 172.

The lower cross member 166 is provided with two cut-out portions 172 to allow passage of the rails 52 and flanges 178 of the associated conveyor assembly therethrough.

The tongue 154 serves as a connecting point for connecting the discharge ends 38, 50 of the first and second bridge conveyor assemblies 34, 48, respectively, as will be described below.

In the case of all conveyor assemblies, a connection affording the three functional movements common to all (horizontal pivoting, limited vertical tilting, and limited vertical movement) is provided between the discharge section of the conveyor 32 of the machine 12 and the receiving section 36 of the first bridge conveyor assembly 34, between the discharge section 38 of the first bridge conveyor assembly 34 and the receiving section 40 of the propelled conveyor assembly 42, between the discharge section 44 of the propelled conveyor assembly 42 and the receiving section 46 of the second bridge conveyor assembly 48, and between the discharge section 50 of the second bridge conveyor assembly 48 and the receiving section of the floor conveyor 14.

As can be seen in FIG. 2, the first and second bridge conveyor assemblies 34 and 48 are connected at their respective receiving and discharge sections by pin connections 72 to adjacent conveyor assemblies. The connections 72 are made in such a manner that the portion of the associated bridge conveyor assembly making up the pin connection 72 lies atop the portion of the adjacent conveyor assembly or dolly assembly tongue making up the remainder of the pin connection 72.

Figure 14:
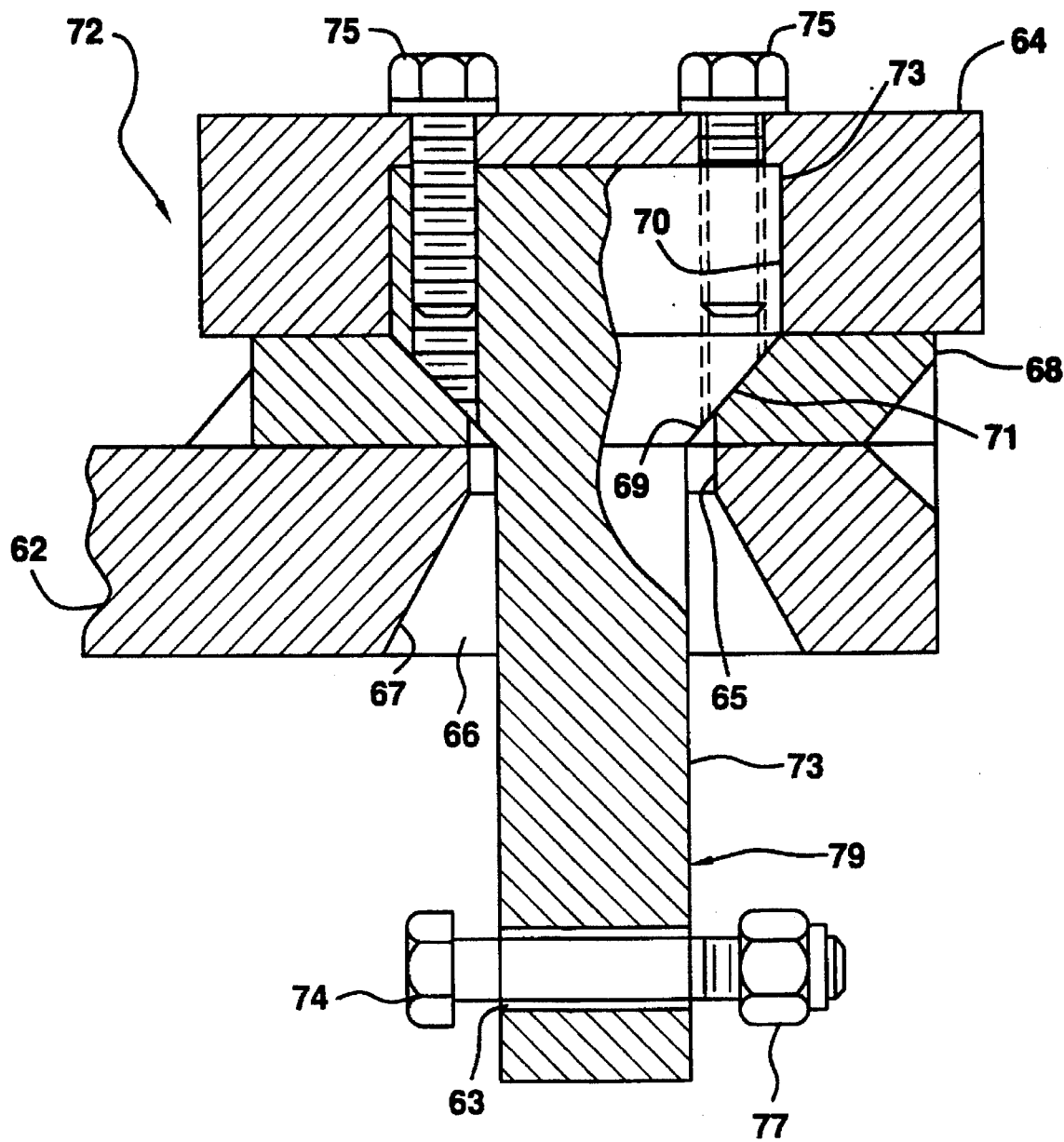
FIG. 14 is a fragmentary sectional view of a pin connection of a preferred embodiment of the present invention taken along the line XIV—XIV in FIG. 2.

A detail of connection 72 which is preferably utilized is illustrated in FIG. 14. As shown, a rearwardly or forwardly extending rigid portion 62 of the frame of the adjacent conveyor assembly to which either the discharge or receiving section of an associated bridge conveyor assembly is attached is disposed in underlying relation to a mounting member 64 fixed to the associated receiving or discharge section of the associated bridge conveyor assembly. The mounting member 64 is provided with a recess 70 in its underside in which the preferably cylindrical head 73 of a headed pin 79 is received and held fixed as by bolts 75. The frame portion 62 has attached thereto, as by welding, an annular spacer 68 disposed thereabove. An aperture 69 of the spacer 68 is conically shaped to receive a frusto-conically shaped portion 71 of the pin 79. An aperture 66 of frame portion 62 has a cylindrical portion 65 and an outwardly flared conical portion 67.

To accommodate the vertical pivoting capability of the propelled conveyor assemblies, pin 79, and the bridge assembly to which it is fixed, should preferably be able to tilt by at least 20° with respect to the frame portion 62 of the adjacent propelled conveyor assembly. Accordingly, pin 79 extends through the spacer 68 and aperture 66 in angularly spaced relation between the cylindrical portion 73 of the pin 79 and the cylindrical portion 65 of the aperture 66 sufficient to provide a limited amount of tilt as, for example, 25°. The conical portion 67 of aperture 66 enhances the tiltability of the pin 79 within the aperture 66. The engagement of frusto-conical portion 71 of pin 79 with the conically shaped aperture 69 of the spacer 68 urges the pin 79 toward a centered position with respect to the aperture 66 of the frame portion 62. The lower end of the pin 79 has a lateral hole 63 therethrough to receive a bolt 74, on which a nut 77 is threaded, which serves to retain the pin 79 in the aperture 66. The limited amount of vertical movement provided is functionally insignificant. Functionally, however, the limited 25° tilting movement reflects in a significant amount of vertical pivoting movement measured at the opposite end of the tilting conveyor assembly.

Figure 4:
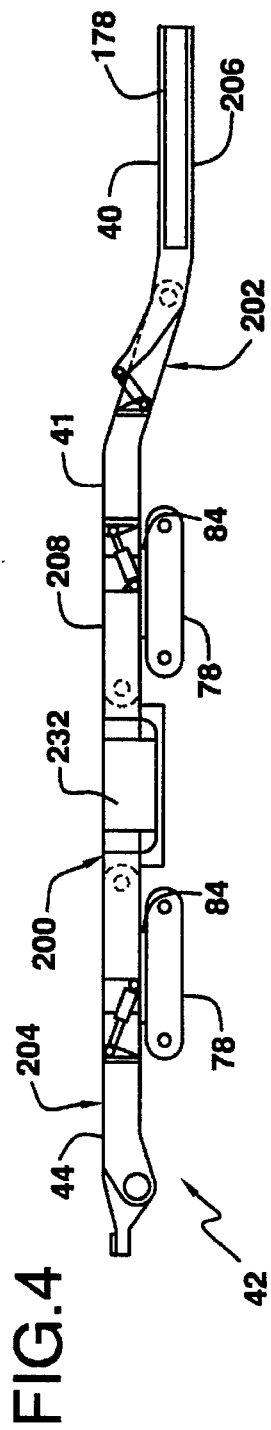
FIG. 4 is a side elevational view of the propelled conveyor assembly of the present invention.

As shown in FIGS. 3 and 4, the apparatus 10 is supported off the ground by two crawler units 78 mounted to and disposed below the propelled conveyor assembly 42, which also provide the means for propelling the propelled conveyor assembly.

Figure 9:
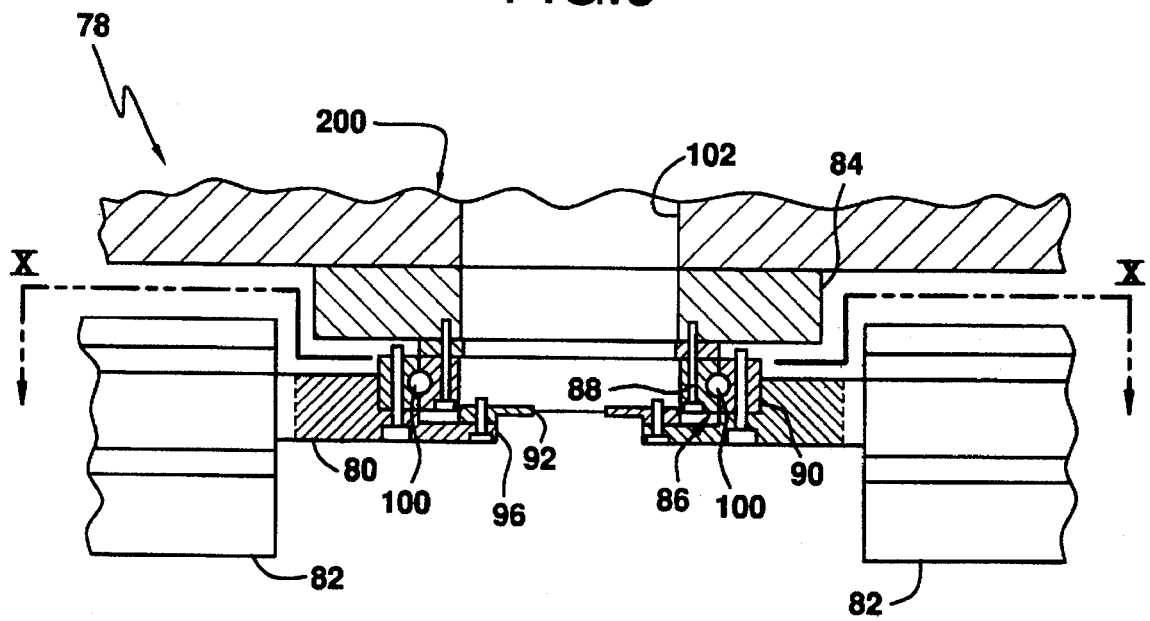
FIG. 9 is a fragmentary front view, partly in section, of a crawler unit connection assembly of a preferred embodiment of the present invention taken along the line IX—IX in FIG. 3.
Figure 10:
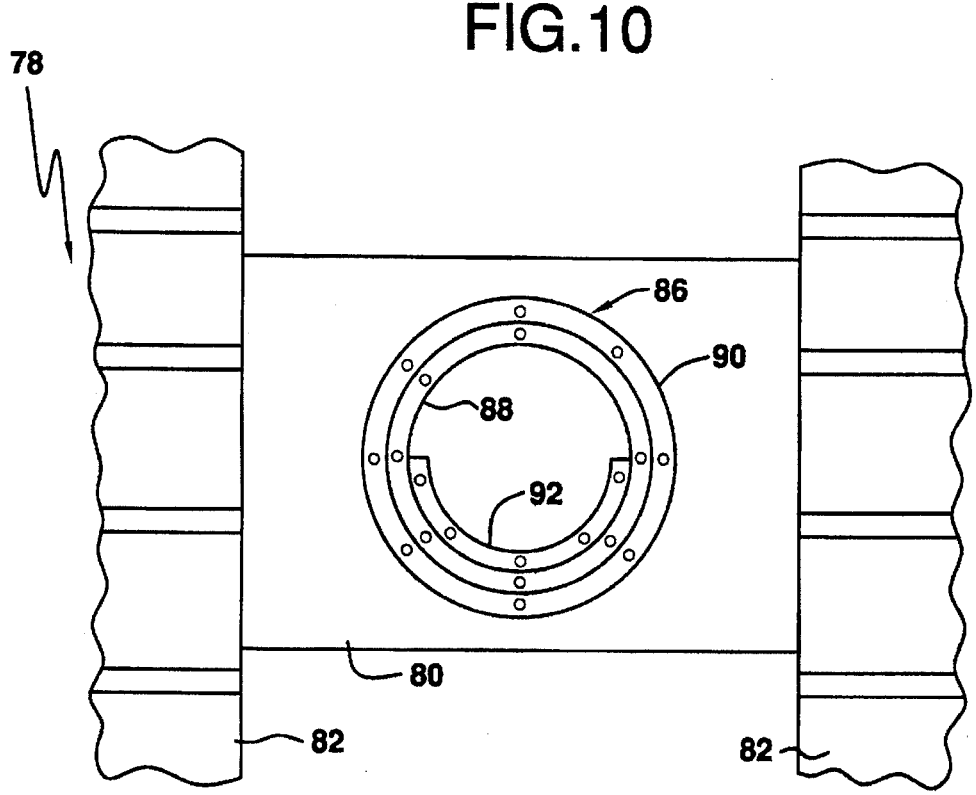
FIG. 10 is a fragmentary top plan view taken along line X—X in FIG. 9.

As best shown in FIGS. 9 and 10, each crawler unit 78 includes a crawler frame structure 80 which carries a pair of longitudinally coextensive parallel power driven endless track assemblies 82. The crawler frame structure 80 preferably is a steel plate construction and includes a suitable aperture 96 therethrough. The endless track assemblies are of conventional construction and each is independently power driven and controlled in the usual way for movement in either one of two opposite directions.

The central frame structure 200 is constructed so as to include rigid mounting structures 84 (shown in phantom in FIG.3) proximate the leading and trailing frame assemblies 202, 204. A large diameter ball bearing, generally indicated at 86, serves to connect each mounting structure 84 to the central portion of the crawler frame structure 80 of the associated crawler unit 78 disposed therebelow. The bearing 86 includes an inner race 88 fixed, as by bolts or the like, to the underside of the mounting structure 84.

Fixed to the upper surface of the central portion of the crawler unit frame structure 80, as by bolts or the like, is an outer race 90 of the bearing 86. Disposed between the inner race 88 and the outer race 90 is a plurality of ball bearings 100. The arrangement is such that the crawler frame structure 80, fixed to the mounting structure 84 by the bearing 86, is rotatable about the vertical axis of frame structure aperture 96. The vertical axis of rotation is disposed with respect to the endless track assemblies 82 transversely centrally between the longitudinal coextensive extent thereof.

The crawler unit 78 includes means (not shown) for limiting horizontal rotation of the frame structure 80 with respect to the central frame structure 200 to 90° in either direction. This is to prevent wind up of attendant hydraulic lines.

The crawler unit 78 of the present invention preferably includes braking or locking capability to lock the crawler frame structure 80 to the central frame structure 200, so as to prevent the horizontal rotation of the crawler frame structure 80 with respect to the central frame structure 200. The capability is achieved by providing a disk brake apparatus. The disk 92 is fixed, as by bolts or the like, to a peripheral portion of the aperture 96 of the crawler frame structure 80. As shown in FIG. 10, the disk 92, comprises a semi-annular ring or 180° sector. Because rotation of the crawler unit 78 is limited to 90° in either direction, only a 180° disc sector is needed.

An aperture 102 is provided through the rigid mounting structure 84, predominantly to permit access to the crawler unit attachment assembly and braking mechanism. The aperture 102 includes a notch 98 in which is disposed a standard spring lock hydraulic release caliper (not shown) oriented so as to be engageable with the disc 92. The caliper is spring biased so as to clamp, or lock, the disc 92. The caliper may be released by hydraulic actuation so as to permit rotation of the crawler unit 78 with respect to the central frame structure 200. After the crawler unit 78 has been rotated into a desired orientation, the hydraulic actuation may be removed to re-lock the crawler unit, or the hydraulic actuation may be maintained to maintain rotatability of the crawler unit as desired.

It sometimes occurs in the operation of the conveyor apparatus 10, due to the inevitable irregularities in the mine floor, that the central portion of the bridge conveyor assemblies 34 or 48 will engage a high point in the floor or the endless track assemblies 82 of the crawler units 78 will engage a low point in the mine floor resulting in the weight of the conveyor assembly being supported directly on the mine floor, rather than the crawler unit, in such a way that the endless track assemblies 82 loose their traction with the mine floor and hence their ability to move the propelled conveyor assembly 42, as desired. In order to extricate the conveyor apparatus under these circumstances, the trailing frame assembly 204 of the propelled conveyor assembly 42 may be raised (as shown in FIG. 8) and/or the inboard section 208 of the leading frame assembly 202 may be raised (as shown in FIG. 6) to effectively lower the crawler units 78 downwardly into tractive engagement with the mine floor. This enables the operator to actuate the endless track assemblies to move the associated crawler unit 78 along the mine floor to the next desired position.

The operation of the conveyor apparatus 10 in conjunction with the floor conveyor 14 is illustrated in FIG. 2. Each crawler unit 78 and 18 is provided with separate controls that enable operators seated at the operator's stations 232 and 15 to actuate either or both of the associated endless track assemblies 82 of each crawler unit 78 and 15 so as to move the propelled conveyor assembly to a desired position along the mine floor between the position at which a machine (not shown) is working at the mine face and the position at which the receiving end of the floor conveyor 14 is operating to move the coal out of the mine. The rotational movement provided by the bearing 86 between each crawler unit 78 and 15 and the rigid mounting structure 84 of the propelled conveyor assemblies 42 and 12 supported thereby enables the operators to manipulate the crawler units to move in substantially any direction. With the 180° movement available in each crawler unit, the operators have the capability of turning each crawler unit frame structure 80 about the vertical axis into any angular position of extent of the endless track assemblies 82 simply by reversing the direction of movement of either of the track assemblies 82. Once the endless track assemblies are aligned in any angular position, movement in either direction can be accomplished by simply actuating both endless track assemblies in that direction. As the propelled conveyor assembly 42 is moved along the mine floor, the second bridge conveyor assembly 48 whose receiving end 46 is supported thereon can accommodate the movement by pivoting horizontally about the vertical axis of the pin 79 or by tilting vertically about the axis as allowed between pin 79 and hole 66 of connection 72. Movement imparted to the bridge-conveyor assembly 48 by the propelled conveyor assembly 42 is accommodated insofar as the discharge end of the bridge conveyor assembly 48 and the floor conveyor 14 are concerned by virtue of the connection 72 and dolly assembly 128 associated therewith. The connections, as aforesaid, permit pivoting movement of the bridge conveyor assemblies horizontally and tilting movements vertically.

Thus far, the apparatus of the present invention has been illustrated in FIG. 2 as a 2+2 detached system having two propelled conveyor assemblies 12 and 42 and 2 bridge conveyor assemblies 35 and 48. It will be understood, however, that the apparatus of the present invention may also include any number of propelled conveyor assemblies and bridge conveyor assemblies connected end to end in alternating fashion to form a conveyor train between a machine working at the mine face and a remote floor conveyor. In addition, the apparatus of the present invention may comprise an attached system wherein the leading conveyor assembly in the conveyor train is a bridge conveyor assembly attached directly to the machine working at the mine face. Such a system is illustrated in FIG. 15. The system in FIG. 15 is identical to the system illustrated in FIG. 2 except that the first bridge conveyor assembly 34 is attached directly to a continuous mining machine 250 instead of being connected to a propelled conveyor assembly. The continuous mining machine 250 is of a conventional structure and is pivotally attached by any suitable means to the receiving section of bridge conveyor assembly 34.

The apparatus of the present invention has general utility with any type of machine capable of working at the mine face and delivering coal removed from the face to the floor conveyor. Although the conveyor apparatus 10 would have utility with several types of continuous mining machines, it is particularly suited to a machine such as the WILCOX Mark 22 Continuous Miner manufactured by Fairchild, Incorporated of Glen Lyn, Va., the details of construction and operation of which are disclosed in U.S. Pat. No. 4,341,424, and the disclosure of which is hereby incorporated by reference into the present specification. Other continuous mining machines to which the present subject matter is particularly applicable includes the WILCOX Mark 20 Continuous Miner which is constructed in accordance with the principles set forth in Wilcox U.S. Pat. No. 2,967,701, the disclosure of which is hereby incorporated by reference into this application.

It will be understood, however, that the machine which supplies a supply of coal to be conveyed by the apparatus of the present invention to a remote floor conveyor may also comprise a conventional coal loading machine a well as a continuous mining machine.

FIG. 16 illustrates a further embodiment of the present invention. An attached system is illustrated in FIG. 16 having two propelled conveyor assemblies 12 and 42, two bridge conveyor assemblies 34 and 48, and a third bridge conveyor assembly 252 extending from the receiving section of propelled conveyor assembly 12 to a machine 250 working at the mine face. The bridge conveyor assembly 252 is connected to the continuous mining machine 250 by any suitable means so as to be preferably horizontally pivotable with respect to the continuous mining machine 250.

Figure 17:
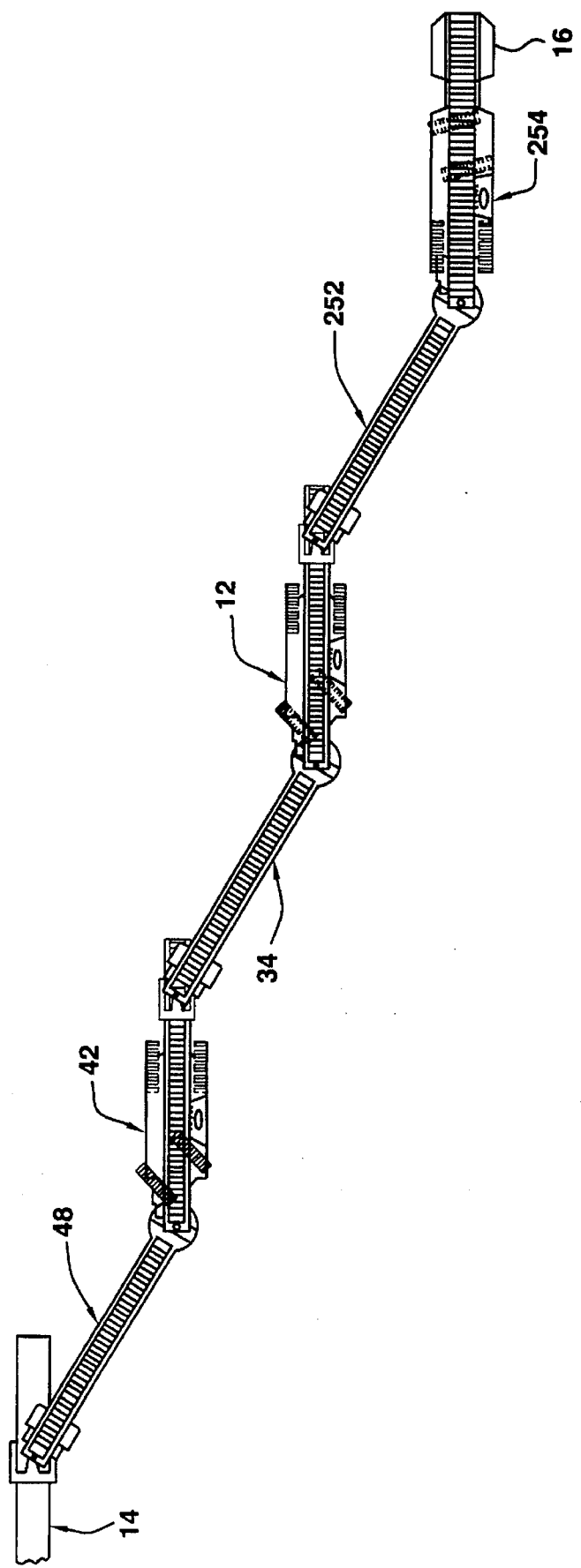
FIG. 17 is a top plan view illustrating an operative position of the apparatus embodying the principles of the present invention in a detached system comprising three bridge conveyors and three mobile bridge carriers operatively extending from a remote floor conveyor.

A still further embodiment of the present invention is shown in FIG. 17. FIG. 17 shows a detached system having two propelled conveyor assemblies 12 and 42, three bridge conveyor assemblies 252, 34, and 48, and a third propelled conveyor assembly 254 extending outwardly away from bridge conveyor assembly 252. Propelled conveyor assembly 254 is preferably identical to propelled conveyor assemblies 12 and 42. Preferably, a hopper assembly 16 is provided at the receiving section of propelled conveyor assembly 254. Propelled conveyor assembly 254 is adapted to receive a supply of coal from a machine working at the mine face (not shown). The system shown in FIG. 17 is commonly known as a 3+3 system.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed:

1. An apparatus for use in a conveyor train for conveying a supply of coal supplied by a machine working at a mine face to a spaced floor conveyor arranged to convey the coal away from the conveyor train, said apparatus comprising:

a propelled conveyor unit having a conveying mechanism providing a receiving section and a discharge section, said conveying mechanism being constructed and arranged to convey a supply of coal from the receiving section thereof to the discharge section thereof;

said propelled conveyor unit adapted to receive, at said receiving section of the conveying mechanism thereof, a supply of coal which has been supplied by the machine working at the mine face;

said propelled conveyor unit including a rigid central frame structure and first and second crawler units disposed below and in supporting relation to said rigid central frame structure, said first and second crawler units being disposed in longitudinally spaced relationship with respect to each other and between said receiving section of the conveying mechanism of said propelled conveyor unit and said discharge section of the conveying mechanism of said propelled conveyor assembly, each of said first and second crawler units including a crawler frame structure, a pair of longitudinally coextensive parallel endless track assemblies connected with said crawler frame structure, a crawler mounting assembly constructed and arranged to support an associated end of said rigid central frame structure for horizontal rotating movement of each crawler unit about a vertical axis disposed between the pair of endless track assemblies and intermediate the longitudinal extent thereof, and a power operated drive unit constructed and arranged to selectively independently drive each endless track assembly of said pair of endless track assemblies of each crawler unit in either direction so as to permit each crawler unit to be pivoted horizontally about said vertical axis with respect to said rigid central frame structure in response to each endless track assembly being driven at equal speeds in opposite directions to thereby enable the crawler frame structure to be translated from any pivotal position, into which each crawler unit has been pivoted, rectilinearly in either direction in response to each endless track assembly being driven at equal speeds in said direction.

2. An apparatus for use in a conveyor train for conveying a supply of coal supplied by a machine working at a mine face to a spaced floor conveyor arranged to convey the coal away from the conveyor train, said apparatus comprising:

a propelled conveyor assembly having a conveying mechanism providing a receiving section and a discharge section, said conveying mechanism being constructed and arranged to convey a supply of coal from the receiving section thereof to the discharge section thereof;

said propelled conveyor assembly adapted to receive, at said receiving section of the conveying mechanism thereof, a supply of coal which has been supplied by the machine working at the mine face;

said propelled conveyor assembly including a frame assembly and first and second crawler units disposed below and in supporting relation to said frame assembly, said first and second crawler units being disposed in longitudinally spaced relationship with respect to each other and between said receiving section of the conveying mechanism of said propelled conveyor assembly and said discharge section of the conveying mechanism of said propelled conveyor assembly, the conveying mechanism of said propelled conveyor assembly further including an intermediate section continuous with and disposed rearwardly from said receiving section of the conveying mechanism, said intermediate section of the conveying mechanism of said propelled conveyor assembly being constructed and arranged to pivot vertically about a generally horizontal intermediate pivot axis with respect to said frame assembly and said receiving section of the conveying mechanism of said propelled conveyor assembly being constructed and arranged to pivot vertically about a generally horizontal receiving section pivot axis with respect to said intermediate section of said conveying mechanism, each of said first and second crawler units including a crawler frame structure, a pair of longitudinally coextensive parallel endless track assemblies connected with said crawler frame structure, a crawler mounting assembly constructed and arranged to support an associated end of said frame assembly for horizontal rotating movement of each crawler unit about a vertical axis disposed between the pair of endless track assemblies and intermediate the longitudinal extent thereof, and a power operated drive unit constructed and arranged to selectively independently drive each endless track assembly of said pair of endless track assemblies of each crawler unit in either direction so as to permit each crawler unit to be pivoted horizontally about said vertical axis with respect to said frame assembly in response to each endless track assembly being driven at equal speeds in opposite directions to thereby enable the crawler frame structure to be translated from any pivotal position, into which each crawler unit has been pivoted, rectilinearly in either direction in response to each endless track assembly being driven at equal speeds in said direction.

3. Apparatus as defined in claim 2 wherein said discharge section of said of said conveying mechanism of said propelled conveyor assembly is constructed and arranged to pivot vertically about a generally horizontal discharge section pivot axis with respect to said frame assembly.

4. Apparatus as defined in claim 3 wherein a one of said first and second crawler units includes a rotation arresting apparatus constructed and arranged to selectively prevent horizontal rotation of said one of said first and second crawler units with respect to said frame assembly.

5. Apparatus as defined in claim 4 wherein each of said first and second crawler units includes a rotation arresting apparatus constructed and arranged to selectively prevent horizontal rotation of each of said first and second crawler units with respect to said frame assembly.

6. Apparatus as defined in claim 3 wherein said frame assembly of said propelled conveyor assembly includes a trailing frame structure and a central frame structure disposed forwardly of said trailing frame structure, said trailing frame structure operatively supporting said discharge section of the conveying mechanism of said propelled conveyor assembly for vertically pivotal movement with respect to said central frame structure.

7. Apparatus as defined in claim 6 wherein said propelled conveyor assembly includes a trailing frame structure actuating system operatively mounted between said trailing frame structure and said central frame structure and constructed and arranged to cause said trailing frame structure to pivot vertically with respect to said central frame structure.

8. Apparatus as defined in claim 2 wherein said propelled conveyor assembly includes a conveyor operator's station.

9. Apparatus as defined in claim 8 wherein a one of said first and second crawler units includes a rotation arresting apparatus constructed and arranged to selectively prevent horizontal rotation of said one of said first and second crawler units with respect to said frame assembly.

10. Apparatus as defined in claim 2 wherein a one of said first and second crawler units includes a rotation arresting apparatus constructed and arranged to selectively prevent horizontal rotation of said one of said first and second crawler units with respect to said frame assembly.

11. Apparatus as defined in claim 2 wherein each of said first and second crawler units are mounted to said frame assembly by a ball bearing assembly having a first and a second race with a plurality of ball bearings disposed therebetween so that said first race is rotatable with respect to said second race, said first race being fixedly mounted to said frame assembly and said second race being fixedly mounted to said crawler frame structure of an associated one of said first and second crawler units.

12. Apparatus as defined in claim 2 wherein said frame assembly of said propelled conveyor assembly includes a leading frame structure and a central frame structure disposed rearwardly of said leading frame structure, said leading frame structure including an inboard section and an outboard section, said inboard section operatively supporting said intermediate section of the conveying mechanism of said propelled conveyor assembly for vertically pivotal movement with respect to said central frame structure and said outboard section operatively supporting said receiving section of the conveying mechanism of said propelled conveyor assembly for vertically pivotal movement with respect to said inboard section.

13. Apparatus as defined in claim 12 wherein said propelled conveyor assembly includes an inboard section actuation system operatively mounted between said inboard section and said central frame structure and constructed and arranged to cause said inboard section to pivot vertically with respect to said central frame structure, and an outboard section actuating system operatively mounted between said outboard section and said inboard section and constructed and arranged to cause said outboard section to pivot vertically with respect to said inboard section.

14. Apparatus as defined in claim 2 wherein said receiving section of the conveying mechanism of said propelled conveyor assembly includes a hopper assembly constructed and arranged to receive a supply of coal supplied by the machine working at the mine face and to direct the supply of coal to said conveying mechanism of said propelled conveyor assembly.

15. The Apparatus as defined in claim 2, further comprising:

a bridge conveyor assembly disposed in the conveyor train between said propelled conveyor assembly and the floor conveyor, said bridge conveyor assembly having a conveying mechanism providing a receiving section and a discharge section, said conveying mechanism of said bridge conveyor being constructed and arranged to convey a supply of coal from the receiving section thereof to the discharge section thereof;

a positioning mechanism constructed and arranged to position the receiving section of the conveying mechanism of said bridge conveyor assembly in a position to receive a supply of coal discharged from said discharge section of the conveying mechanism of said propelled conveyor assembly and to enable said bridge conveyor assembly to be pivoted horizontally with respect to the propelled conveyor assembly; and a translating connection assembly constructed and arranged to mount said discharge section of the conveying mechanism of said bridge conveyor assembly on said floor conveyor, said translating connection assembly being constructed and arranged to provide longitudinal movement of said discharge section of the conveying mechanism of said bridge conveyor assembly above said floor conveyor and to allow horizontal pivoting movement of said bridge conveyor assembly with respect to said floor conveyor when connected thereto so as to discharge the coal from the discharge section of the conveying mechanism of said bridge conveyor assembly onto the floor conveyor in any position of movement with respect thereto.

16. Apparatus as defined in claim 15, further comprising:

a second bridge conveyor assembly disposed in the conveyor train forwardly of said propelled conveyor assembly and a second propelled conveyor assembly disposed in said conveyor train forwardly of said second bridge conveyor assembly, said second bridge conveyor assembly and said second propelled conveyor assembly each having a conveying mechanism providing a receiving section and a discharge section, said conveying mechanisms being constructed and arranged to convey a supply of coal from the receiving section thereof to the discharge section thereof, said second propelled conveyor assembly adapted to receive, at said receiving section of the conveying mechanism thereof, a supply of coal which has been supplied by said machine working at the mine face, said second propelled conveyor assembly including a frame assembly and first and second crawler units disposed below and in supporting relation to said frame assembly, said first and second crawler units being disposed in longitudinally spaced relationship with respect to each other and between said receiving section of the conveying mechanism of said second propelled conveyor assembly and said discharge section of the conveying mechanism of said second propelled conveyor assembly;

a second positioning mechanism constructed and arranged to position the receiving section of the conveying mechanism of said second bridge conveyor assembly in a position to receive a supply of coal discharged from said discharge section of the conveying mechanism of said second propelled conveyor assembly and to enable said second bridge conveyor assembly to be pivoted horizontally with respect to the second propelled conveyor assembly; and a second translating connection assembly constructed and arranged to mount said discharge section of the conveying mechanism of said second bridge conveyor assembly to said receiving section of the conveying mechanism of said propelled conveyor assembly, said second translating connection assembly being constructed and arranged to provide longitudinal movement of said discharge section of the conveying mechanism of said second bridge conveyor assembly above said receiving section of the conveying mechanism of said propelled conveyor assembly and to allow horizontal pivoting movement of said second bridge conveyor assembly with respect to said propelled conveyor assembly so as to discharge the coal from the discharge section of the conveying mechanism of said second bridge conveyor assembly onto the receiving section of the conveying mechanism of said propelled conveyor assembly in any position of movement with respect thereto.

17. Apparatus as defined in claim 16, further comprising:

a third bridge conveyor assembly disposed in the conveyor train between said second propelled conveyor assembly and the machine working at the mine face, said third bridge conveyor assembly having a conveying mechanism providing a receiving section and a discharge section, said conveying mechanism of said third bridge conveyor being constructed and arranged to convey a supply of coal from the receiving section thereof to the discharge section thereof;

a third positioning mechanism constructed and arranged to position the receiving section of the conveying mechanism of said third bridge conveyor assembly in a position to receive a supply of coal which has been supplied by said machine working at the mine face and to enable said third bridge conveyor assembly to be pivoted horizontally with respect to the machine working at the mine face; and a third translating connection assembly constructed and arranged to mount said discharge section of the conveying mechanism of said third bridge conveyor assembly to said receiving section of the conveying mechanism of said second propelled conveyor assembly, said third translating connection assembly being constructed and arranged to provide longitudinal movement of said discharge section of the conveying mechanism of said third bridge conveyor assembly above said receiving section of said second propelled conveyor assembly and to allow horizontal pivoting movement of said third bridge conveyor assembly with respect to said second propelled conveyor assembly so as to discharge the coal from the discharge section of the conveying mechanism of said third bridge conveyor assembly onto the receiving section of the conveying mechanism of said second propelled conveyor assembly in any position of movement with respect thereto.

18. Apparatus as defined in claim 16, further comprising:

a third bridge conveyor assembly disposed in the conveyor train forwardly of said second propelled conveyor assembly and a third propelled conveyor assembly disposed in said conveyor train forwardly of said third bridge conveyor assembly, said third bridge conveyor assembly and said third propelled conveyor assembly each having a conveying mechanism providing a receiving section and a discharge section, said conveying mechanisms being constructed and arranged to convey a supply of coal from the receiving section thereof to the discharge section thereof, said third propelled conveyor assembly adapted to receive, at said receiving section of the conveying mechanism thereof, a supply of coal which has been supplied by said machine working at the mine face, said third propelled conveyor assembly including a frame assembly and first and second crawler units disposed below and in supporting relation to said frame assembly, said first and second crawler units being disposed in longitudinally spaced relationship with respect to each other and between said receiving section of the conveying mechanism of said third propelled conveyor assembly and said discharge section of the conveying mechanism of said third propelled conveyor assembly;

a third positioning mechanism constructed and arranged to position the receiving section of the conveying mechanism of said third bridge conveyor assembly in a position to receive a supply of coal discharged from said discharge section of the conveying mechanism of said third propelled conveyor assembly and to enable said third bridge conveyor assembly to be pivoted horizontally with respect to the third propelled conveyor assembly; and a third translating connection assembly constructed and arranged to mount said discharge section of the conveying mechanism of said third bridge conveyor assembly to said receiving section of the conveying mechanism of said second propelled conveyor assembly, said third translating connection assembly being constructed and arranged to provide longitudinal movement of said discharge section of the conveying mechanism of said third bridge conveyor assembly above said receiving section of the conveying mechanism of said second propelled conveyor assembly and to allow horizontal pivoting movement of said third bridge conveyor assembly with respect to said second propelled conveyor assembly so as to discharge the coal from the discharge section of the conveying mechanism of said third bridge conveyor assembly onto the receiving section of the conveying mechanism of said second propelled conveyor assembly in any position of movement with respect thereto.

19. Apparatus as defined in claim 15, further comprising:

a second bridge conveyor assembly disposed in the conveyor train between said propelled conveyor assembly and the machine working at the mine face, said second bridge conveyor assembly having a conveying mechanism providing a receiving section and a discharge section, said conveying mechanism of said second bridge conveyor being constructed and arranged to convey a supply of coal from the receiving section thereof to the discharge section thereof;

a second positioning mechanism constructed and arranged to position the receiving section of the conveying mechanism of said second bridge conveyor assembly in a position to receive a supply of coal which has been supplied by said machine working at the mine face and to enable said second bridge conveyor assembly to be pivoted horizontally with respect to the machine working at the mine face; and a second translating connection assembly constructed and arranged to mount said discharge section of the conveying mechanism of said second bridge conveyor assembly to said receiving section of the conveying mechanism of said propelled conveyor assembly, said second translating connection assembly being constructed and arranged to provide longitudinal movement of said discharge section of the conveying mechanism of said second bridge conveyor assembly above said receiving section of said propelled conveyor assembly and to allow horizontal pivoting movement of said second bridge conveyor assembly with respect to said propelled conveyor assembly so as to discharge the coal from the discharge section of the conveying mechanism of said second bridge conveyor assembly onto the receiving section of the conveying mechanism of said propelled conveyor assembly in any position of movement with respect thereto.

20. An apparatus as defined in claim 15 wherein the translating connection assembly comprises tracks extending horizontally along opposite sides of a receiving end portion of the floor conveyor, a dolly assembly rollingly supported on said tracks, and an articulating joint between said dolly assembly and said discharge section of said bridge conveyor assembly.

21. Apparatus as defined in claim 15 wherein said bridge conveyor assembly and said propelled conveyor assembly each comprise a twin strand flight chain conveyor.

22. An apparatus for use in a conveyor train for conveying a supply of coal supplied by a machine working at a mine face to a spaced floor conveyor arranged to convey the coal away from the conveyor train, said apparatus comprising:

a propelled conveyor assembly having a conveying mechanism providing a receiving section and a discharge section, said conveying mechanism being constructed and arranged to convey a supply of coal from the receiving section thereof to the discharge section thereof;

said propelled conveyor assembly adapted to receive, at said receiving section of the conveying mechanism thereof, a supply of coal which has been supplied by the machine working at the mine face;

said propelled conveyor assembly including a frame assembly and first and second crawler units disposed below and in supporting relation to said frame assembly, said first and second crawler units being disposed in longitudinally spaced relationship with respect to each other and between said receiving section of the conveying mechanism of said propelled conveyor assembly and said discharge section of the conveying mechanism of said propelled conveyor assembly, said propelled conveyor assembly including a conveyor operator's station disposed between said first and second crawler apparatus, each of said first and second crawler units including a crawler frame structure, a pair of longitudinally coextensive parallel endless track assemblies connected with said crawler frame structure, a crawler mounting assembly constructed and arranged to support an associated end of said frame assembly for horizontal rotating movement of each crawler unit about a vertical axis disposed between the pair of endless track assemblies and intermediate the longitudinal extent thereof, and a power operated drive unit constructed and arranged to selectively independently drive each endless track assembly of said pair of endless track assemblies of each crawler unit in either direction so as to permit each crawler unit to be pivoted horizontally about said vertical axis with respect to said frame assembly in response to each endless track assembly being driven at equal speeds in opposite directions to thereby enable the crawler frame structure to be translated from any pivotal position, into which each crawler unit has been pivoted, rectilinearly in either direction in response to each endless track assembly being driven at equal speeds in said direction.

23. Apparatus as defined in claim 22 wherein a one of said first and second crawler units includes a rotation arresting apparatus constructed and arranged to selectively prevent horizontal rotation of said one of said first and second crawler units with respect to said frame assembly.

24. An apparatus for use in a conveyor train for conveying a supply of coal supplied by a machine working at a mine face to a spaced floor conveyor arranged to convey the coal away from the conveyor train, said apparatus comprising:

a propelled conveyor assembly having a conveying mechanism providing a receiving section and a discharge section, said conveying mechanism being constructed and arranged to convey a supply of coal from the receiving section thereof to the discharge section thereof;

said propelled conveyor assembly adapted to receive, at said receiving section of the conveying mechanism thereof, a supply of coal which has been supplied by the machine working at the mine face;

said propelled conveyor assembly including a frame assembly and first and second crawler units disposed below and in supporting relation to said frame assembly, said first and second crawler units being disposed in longitudinally spaced relationship with respect to each other and between said receiving section of the conveying mechanism of said propelled conveyor assembly and said discharge section of the conveying mechanism of said propelled conveyor assembly, each of said first and second crawler units including a crawler frame structure, a pair of longitudinally coextensive parallel endless track assemblies connected with said crawler frame structure, a crawler mounting assembly constructed and arranged to support an associated end of said frame assembly for horizontal rotating movement of each crawler unit about a vertical axis disposed between the pair of endless track assemblies and intermediate the longitudinal extent thereof, and a power operated drive unit constructed and arranged to selectively independently drive each endless track assembly of said pair of endless track assemblies of each crawler unit in either direction so as to permit each crawler unit to be pivoted horizontally about said vertical axis with respect to said frame assembly in response to each endless track assembly being driven at equal speeds in opposite directions to thereby enable the crawler frame structure to be translated from any pivotal position, into which each crawler unit has been pivoted, rectilinearly in either direction in response to each endless track assembly being driven at equal speeds in said direction, at least one of said first and second crawler units including a rotation arresting apparatus constructed and arranged to selectively prevent horizontal rotation of said one of said first and second crawler units with respect to said frame assembly.

25. Apparatus as defined in claim 24 wherein said rotation arresting apparatus includes a disc sector, having an axis of rotation, fixedly mounted to said crawler frame structure of said one of said first and second crawler units so that said axis of rotation coincides with said vertical axis about which said one of said first and second crawler units rotates with respect to said central frame structure and a caliper, operatively mounted to said frame assembly so as to be selectively engageable with said disc sector.

* * * * *